United States Patent [19]

Reu

[11] Patent Number: 4,941,934

[45] Date of Patent: Jul. 17, 1990

[54] METHOD OF MAKING PROTECTIVE CAPS FOR THREADED PIPE ENDS OR PIPE SOCKETS AND PROTECTIVE CAP MADE BY SAID METHOD

[76] Inventor: Winfried Reu, Goethestrasse 27, 4700 Hamm, Fed. Rep. of Germany

[21] Appl. No.: 262,991

[22] Filed: Nov. 2, 1988

[30] Foreign Application Priority Data

Nov. 5, 1987 [DE] Fed. Rep. of Germany ....... 3738417

[51] Int. Cl.$^5$ .................................. B32B 1/00
[52] U.S. Cl. ................................. 156/195; 156/244.13
[58] Field of Search ............... 156/171, 172, 173, 175, 156/143–144, 195, 184, 189, 245, 244.11, 244.13, 244.15, 250, 244.18, 193; 411/904, 908; 138/96 R, 96 T; 215/356, 364

[56] References Cited

U.S. PATENT DOCUMENTS

| | | | |
|---|---|---|---|
| 2,629,894 | 3/1953 | Boggs | 156/175 X |
| 2,928,764 | 3/1960 | Magoon | 156/173 X |
| 3,484,317 | 12/1969 | Dickerson | 156/175 |
| 3,661,670 | 5/1972 | Pierpont | 156/175 X |
| 3,788,918 | 1/1974 | Poulsen | 156/173 X |
| 4,213,641 | 7/1980 | Bennett | 156/173 X |

FOREIGN PATENT DOCUMENTS

57-82022  5/1982  Japan ................................. 156/171

*Primary Examiner*—David Simmons
*Attorney, Agent, or Firm*—Thomas S. Baker, Jr.

[57] ABSTRACT

Method of making a thermoplastic protective cap having a cylindrical wall from a thermoplstic profile comprising the following steps:
  heating the thermoplastic profile;
  winding the thermoplastic plastic profile in helically overlapping form onto a mandrel to obtain a wall thickness of between ten and ninety percent of total cap wall thickness;
  winding a thermoplastic plastic profile containing reinforcing material in helically overlapping form onto a mandrel containing said thermoplastic plastic profile to obtain the remainder of the cap wall thickness.

24 Claims, 3 Drawing Sheets

METHOD OF MAKING PROTECTIVE CAPS FOR THREADED PIPE ENDS OR PIPE SOCKETS AND PROTECTIVE CAP MADE BY SAID METHOD

The invention relates to a method of making protective caps consisting of thermoplastic plastic for threaded pipe ends or pipe sockets or connecting sleeves, the protective caps being provided with a reinforcing material.

Such protective caps are meanwhile in extensive use in the transport and storage of oil-field pipes, such as tubing and casing pipes, which are always provided at their ends with threads or already screwed-on connecting sleeves or sockets, or with an external thread at one end and a thickened socket and internal thread at the other end.

The highly sensitive and extremely highly loadbearing fine threads of such pipes or tubes require apart from corrosion protection in particular protection from mechanical damage as can arise under rough treatment due to loading play, crane hook transport, knocking on loading hatches or edges, slipping over stacks, etc.

As a rule such plastic protective caps are therefore reinforced with annular steel inserts.

The production of such protective caps consisting of steel-plastic composite material is made relatively complicated in that firstly the steel ring must be very accurately positioned in an injection mould forming a negative mould to the protective cap and thereafter the injection mould must be filled under very high pressure by an extruder.

Apart from the necessity of achieving right at the beginning of each filling operation as quickly as possible a stationary flow state for the thermoplastic plastic and the resulting necessary extremely complicated design of the injection mould and the extruder, each with extensive cooling and heating means, on cooling of the composite material due to the inadequate bonding between plastic and steel and the different coefficients of thermal expansion pronounced shrinkage of the plastic takes place.

It is very difficult indeed to manage this shrinkage and the latter is frequently the cause for lack of dimensional stability and even detachment of the composite structure.

Although the protective cap disclosed in DE No. 2,834,443 A1 partly avoids the problems resulting from shrinkage by employing a steel core provided with passages and thus a formlocking connection, the complicated injection moulding method is still necessary. The limitations of this method are strikingly apparent precisely in the production of protective caps for tubes of large diameter, for instance in this case casing pipes with diameters of more than 14", in the complicated temperature control of the injection mould, very large and uneconomic extruders and a very slow process cycle.

Moreover, the high weight of plastic protective caps reinforced by steel rings is not only very disadvantageous in protective caps of larger diameter but even with small dimensions makes the handling on screwing on and off more difficult and increases transport costs.

Two further difficulties result from the use of a composite material of two materials such as steel and plastic which are so different in their elasticity/plasticity behaviours.

A protective cap, the steel ring of which, due to production or by external damage before or after the screwing on, has become oval or even dented forces the thermoplastic material into its shape and cannot be screwed on or off, or at least without great difficulty.

The second disadvantage due to the combination of steel and plastic is that such protective caps cannot be used again. Recycling would require separation of plastic and steel and this can only be done with great expenditure, both in the mechanical methods and in the thermal methods. The usual protective caps are thus products which can only be used once and then discarded.

The invention was therefore based on the problem of providing a method with which in short cycle times protective caps provided with reinforcing material and consisting of thermoplastic plastic can be made even for large pipe diameters in simple manner and with the minimum possible weight, which furthermore avoids shrinkage and contraction processes of the plastic in the bonding to the reinforcing material, which ensures for the protective cap not only plastic deformability but at the same time elastic deformability and which finally employs used protective caps again as a basis for new manufacture thereof.

This problem is solved by the features set forth in the characterizing clause of the main claim.

Advantageous further developments of the solution according to the invention are set forth in the subsidiary claims.

At the same time a protective cap is disclosed which can be made in particularly advantageous manner by the method according to the invention.

The method according to the invention consists firstly in the helically overlapping winding of a thermoplastic plastic profile on a core or mandrel.

The plastic profile has at the most extrusion temperature and is supplied directly after leaving a commercially usual profile extruder to the winding process.

Depending on whether socket or end protective caps are being made, a reinforcing material is introduced in the wall thickness regions which have a distance corresponding to 50–90% of the total wall thickness of the subsequently present protective cap inner or outer thread. After the introduction of the reinforcing material winding is continued with the plastic profile until the total wall thickness is reached and the protective cap thus formed is pushed from the mandrel or core and worked in cutting operations.

With the aid of such a winding method it is not only possible to make the dimensions of protective caps as large as desired but also to eliminate the problems of contraction or shrinkage in the bond between plastic and reinforcing material. The helical winding under ambient pressure exerts a slight tensile force on the heated profile. This tensile force is exactly adjusted so that in conjunction with the relaxation capability of the plastic no remaining transition residual stresses are present in the longitudinal direction of the protective cap, whilst a slight circumferential tension present until complete cooling and adequate relaxation of the plastic generates an exactly matched radially acting compression force which ensures a firm bond between reinforcing material and plastic until after a predetermined cooling and rest time the dissipation of any internal circumferential stress is completed and the cutting finishing by thread cutters can start.

Advantageously, a polyethylene profile can be used for this method because depending on the use of HD (high density) or LD (low density) polyethylene an exact basic tension and strength setting is combined at relatively low temperatures.

A very high production speed and a very economical method of winding is achieved with a mandrel corresponding substantially to several times the length of the protective cap. The resulting multiple length is provided after the winding on a turret lathe firstly with the inner or outer thread, then cut to the individual lengths and the operation then repeated corresponding to the multiple length.

With such multiple lengths the advantages of a temperature control of the mandrel by cooling and heating during winding and/or withdrawal of the protective cap manifest themselves to a particular high degree. Thus, at the start of the winding operation a heating of the mandrel above ambient temperature but substantially below the extrusion temperature of the profile can effect a rapid cooling of the plastic boundary layer bearing on the mandrel and thus avoid any buildup of adhesion between mandrel and protective cap. A cooling of the mandrel beneath the ambient temperature before or during the pushing off of the plastic protective cap effects a further adhesion reduction between plastic protective cap and mandrel by controlled temperature shrinkage of the mandrel and thereby facilitates withdrawal. Such a procedure is equivalent to the use of a folding or hinged mandrel without requiring the complicated construction thereof and assists the effect of a possibly applied parting agent.

A method of introducing the reinforcing material which is very simple as regards production technology is the blowing on of fibre chips. A comminuted reinforcing fibre is blown onto the hot plastic profile, subsequently covered by likewise hot plastic profile and thus bonded firmly into the structure of the protective cap.

If such protective caps are to withstand particularly high loads fibres orientated and bound into mats and/or fabrics are advantageously employed. Such fibre mats or fabrics can also be supplied in reinforced form as rovings, are likewise wound helically onto a hot plastic layer and subsequently again covered with hot plastic.

Due to their high strength and low weight glass fibres and carbon fibres in chip or shred and/or mat form are particularly suitable for use in the method according to the invention. In the composite structure with the plastic these fibres impart to the protective cap apart from its plastic deformability an extremely high elasticity which permits recovery even after heavy mechanical stresses and said caps can therefore be easily screwed on and off even after the action of said load.

Depending on the particular application the use of stretched polyethylene as reinforcing material represents a particularly advantageous procedure. In this case, only a single material, although differently treated, is employed to make the protective cap. In this further development of the method a separate stretched polyethylene profile can be wound as reinforcing layer and alternatively the polyethylene profile normally used to wind the plastic layer can be stretched during the winding of the reinforcing region by a plurality of profile deflection rolls which are movable in their spacing and in the width guiding with respect to each other and which are arranged between the extruder and mandrel. The stretching, i.e. the drawing, effects a linearization of the molecule chains and thus increases the strength of the polyethylene.

The use of a hollow mandrel or core sealed with a cover of the same diameter has the advantage that in the production of protective caps which are sealed at the end said cover, which as a rule is made from a material corresponding to the material of the mandrel, can be replaced by a disc of thermoplastic plastic corresponding to the material of the protective cap.

The edges of said plastic disc, which in the end product form the cap cover, are then fused in the winding method by the hot plastic profile and thus thermally bonded to the outer wall of the protective cap.

An advantageous method for forming a protective cap cover with an inner set back portion, for example for easy gentle crane hook transport of the tube, is made possible in that the cavity of the mandrel is subjected to a pressure substantially below atmospheric pressure. Here, the plastic disc, preheated if required, forms itself in accordance with the inner region of the mandrel and thus gives the desired set back portion or inward projection.

An excess pressure applied in the cavity of the mandrel after the cooling facilitates the pushing of the cap off of the mandrel.

With regard to the reusability and problematical final disposal of non-rotting plastic the protective cap made by the method according to the invention has the advantage that after use it can be comminuted to a granulate of plastic and plastic reinforcing material and at least partially supplied again to a profile extruder for the method according to the invention.

A particularly high ability to withstand external mechanical loads is exhibited by a protective cap which is made by the method according to the invention and has the characterizing features of claim 16. Apart from the simple production in which a plastic profile is wound without interruption until the total wall thickness is achieved and glass fibre chips are blown onto the hot plastic profile only in the region of the reinforcing layer or applied as mat or fabric and thus laminated in, the alternate helical lamination of plastic profile and reinforcing material gives an extremely strong and dimensionally stable composite body.

Advantageously, such a protective cap comprises in the socket form a stepped sealing lip which projects beyond the thread length of the protective cap and beyond the socket centre and has a spigot end which in the screwed condition contacts the end face of the tube.

This provides a sealing which prevents the migration of moisture and penetration thereof into the thread region and thus enhances the effect of the sealing grease usually employed.

Openings for corresponding screwing tools on the portion projecting beyond the pipe end or socket end are important and advantageous for safe handling.

On said openings lifting tools or means also acting with auxiliary drive can be attached to facilitate the screwing on and off even after long storage times.

Expediently, said openings are formed as radial bores or recesses distributed over the periphery which permit a formlocking bonding which has advantages as regards the wear compared with a frictional connection.

Both the method according to the invention and the protective cap made therewith will now be explained with reference to an example of embodiment.

Figure 1:
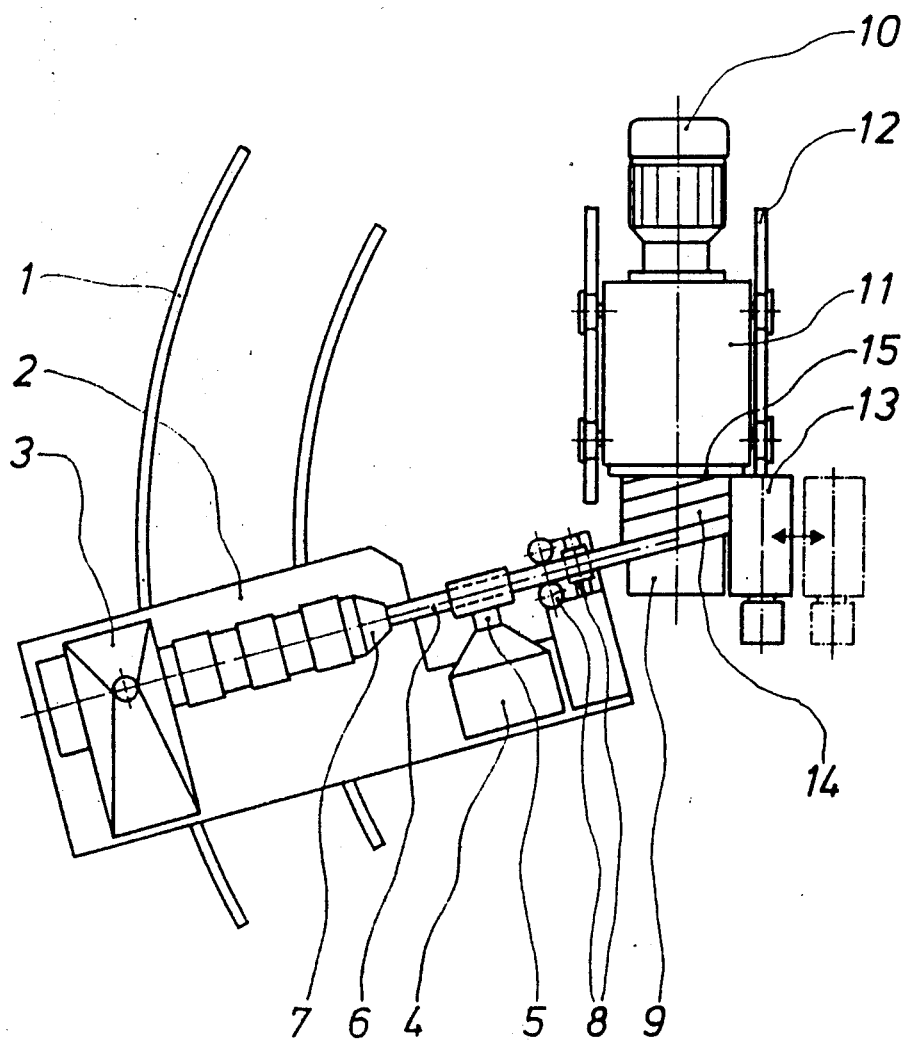
FIG. 1 shows the principle of an apparatus used for carrying out the method.

FIG. 1 shows an extruder carriage 2 which is movable on arcuately arranged rails 1 and which carries the profile extruder 3 and the fibre chopping and application means 4. The cantilever arm 5 of the fibre application means 4 is adjustable in its longitudinal axis in such a manner that the chips transported thereby can be sprinkled or spread onto the plastic profile 6. The plastic profile 6 is formed with the aid of the extruder nozzle 7 and conducted as endless profile strip over the guide and tensioning roller 8 onto the mandrel 9.

The mandrel 9 is provided with a rotary drive 10 and oscillatingly movable on rails 12 on a carriage 11 with respect to the extruder carriage 2. At the start of the winding operation the hot profile 6 emerging from the extruder nozzle 7 is threaded over the guide and tension roller 8 between the mandrel 9 and the press-on roller 13 and the winding operation initiated. After winding of a wall thickness of 20% of the total wall thickness of an end protective cap 14 the fibre application means 4 is switched on and maintained in operation until 30% of the total layer thickness is wound. After winding the total layer thickness the plastic profile 6 is severed between the mandrel 9 and extruder nozzle 7 and the resulting protective cap removed with the aid of the stripper ring 15 from the mandrel 9 and then supplied to a turret lathe, not shown here, for further cutting processing.

Figure 2:
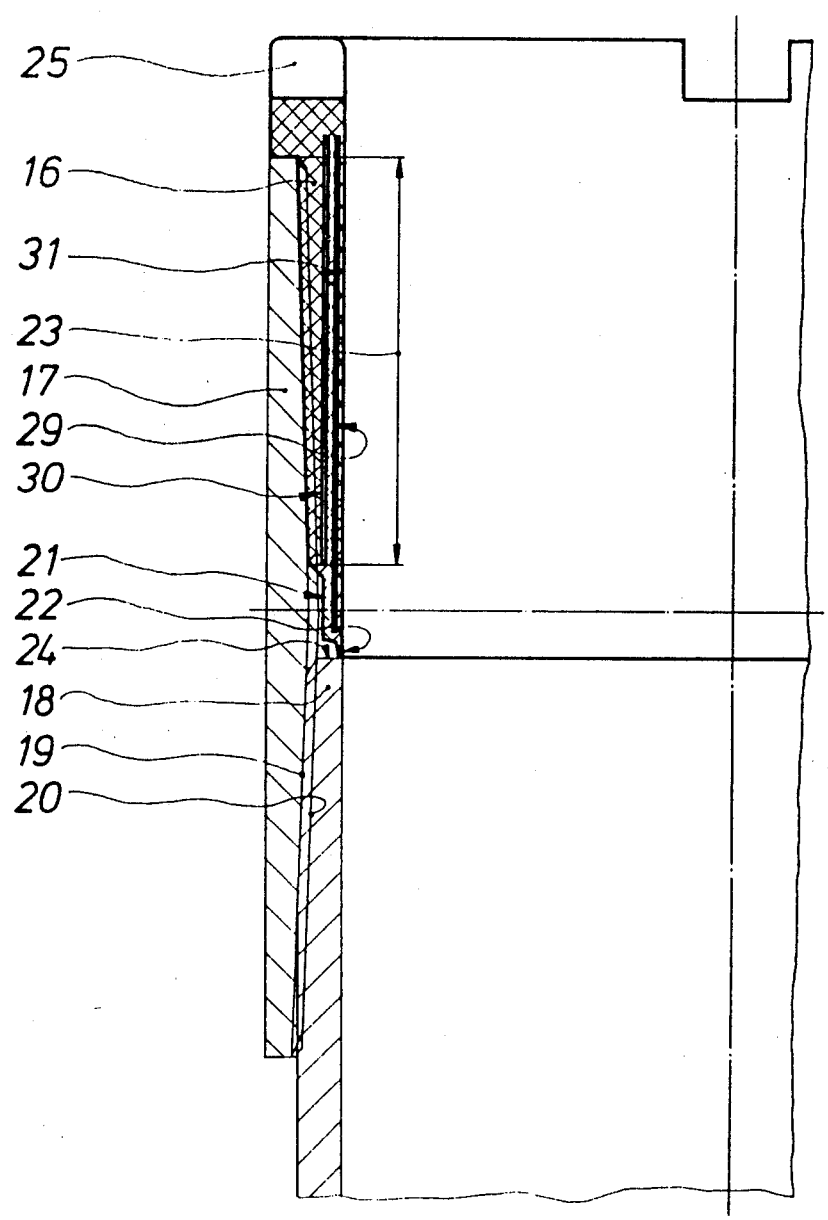
FIG. 2 shows a socket protective cap according to the invention in longitudinal section in the screwed-on state.

FIG. 2 shows a socket protective cap 16 according to the invention into which a socket 17 is screwed which in turn is mounted on a pipe end 18 by a thread connection 19 and 20. The socket protective cap 16 has a stepped integrally formed sealing lip 21 which terminates in a spigot end 22. The spigot end 22 projects beyond the threaded length 23 of the protective cap 16 and beyond the socket centre into the socket 17 and under the screwing-in pressure in the screwed state contacts the end face 24 of the pipe end 18. This prevents any penetration of moisture into the thread regions and avoids corrosion of the loadbearing thread flights The recesses 25 serve to receive corresponding screwing tools.

Figure 3:
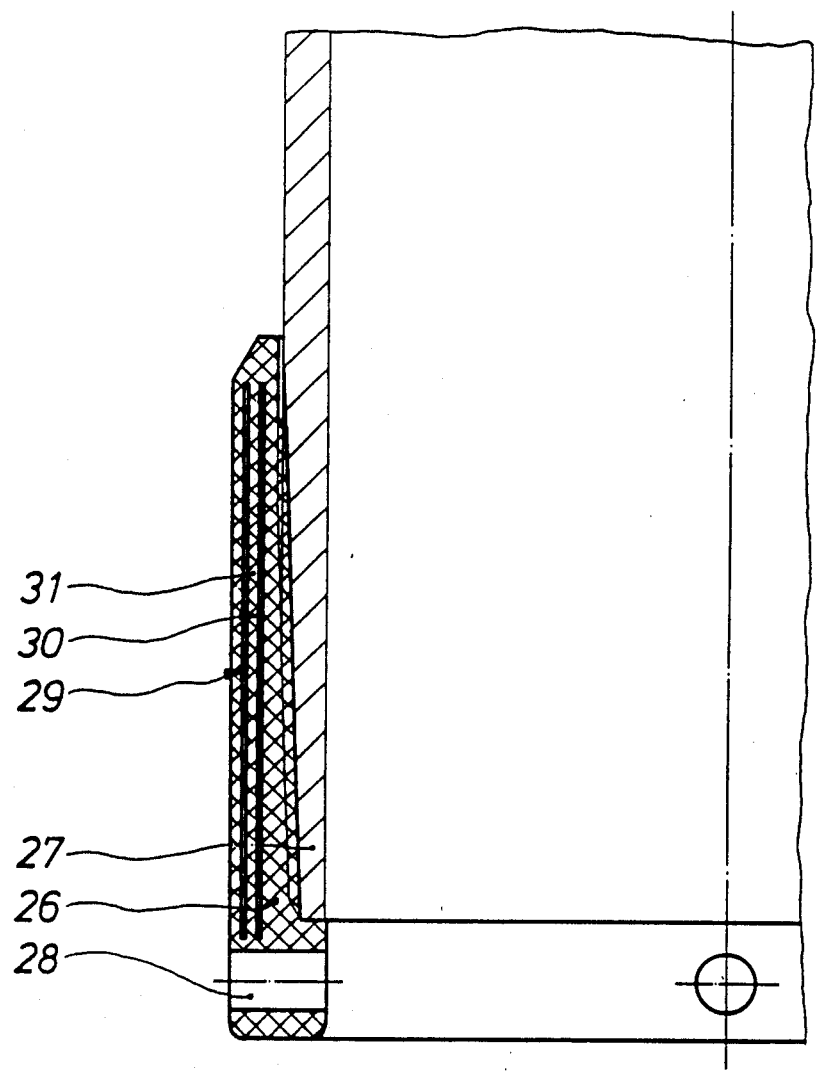
FIG. 3 shows a screwed-on end protective cap according to the invention in longitudinal section.

FIG. 3 shows an end protective cap 26 according to the invention which has been screwed onto a pipe end 27. The end protective cap 26 comprises the radial bores 28 for receiving screwing tools.

Both the caps 16 and 26 have reinforcing layers 29 and 30 of glass fibre mats which are introduced during the winding operation.

The structure of the protective cap as obtained by alternate winding of layers of thermoplastic plastic profile and fibre mats, fabric or chips, is made clearly visible by the plastic profile layer 31 present between the reinforcing layers 29 and 30.

I claim:

1. A method of making a thermoplastic protective cap having a cylindrical wall from a thermoplastic plastic profile comprising the following steps;
    heating the thermoplastic plastic profile;
    winding the thermoplastic plastic profile in helically overlapping form onto a mandrel to obtain a wall thickness of between ten and ninety percent of total cap wall thickness; and
    winding a thermoplastic plastic profile containing a reinforcing material in helically overlapping form onto mandrel containing said thermoplastic plastic profile to obtain the remainder of the cap wall thickness.

2. The method of claim 1 further characterized by;
    stopping the winding of the thermoplastic plastic profile having a reinforcing material prior to obtaining the total wall thickness of the cap; and
    winding the thermoplastic plastic profile over the reinforcing material to obtain the desired cap wall thickness.

3. The method of claim 2 further characterized by;
    forming a thread on the exterior wall of the plastic protective cap.

4. The method of claim 2 further characterized by;
    cutting an internal thread on the inside of the thermoplastic plastic protective cap wall.

5. The method of claim 1 further characterized by;
    the thermoplastic plastic profile comprises a polyethylene material.

6. The method of claim 1 further characterized by;
    the length of the mandrel corresponds substantially to the length of the protective cap wall.

7. The method of claim 1 further characterized by;
    blowing reinforcing material onto the thermoplastic plastic profile during the final winding operation such that said reinforcing material becomes sandwiched within said thermoplastic plastic profile.

8. The method of claim 1 further characterized by;
    the reinforcing material comprises a fiber mat.

9. The method of claim 1 further characterized by;
    the reinforcing material comprises stretched polyethylene.

10. The method of claim 1 further characterized by;
    the reinforcing material comprises glass fibers.

11. The method of claim 1 further characterized by;
    heating the mandrel prior to commencing winding of the thermoplastic plastic profile.

12. The method of claim 1 further characterized by;
    the mandrel comprises a hollow metal sleeve; and
    a thermoplastic cover overlies the end of the mandrel.

13. The method of claim 1 further characterized by;
    subjecting the internal cavity of the mandrel to a pressure less than the ambient pressure.

14. A method of making a thermoplastic protective plug having a cylindrical wall from a thermoplastic plastic profile comprising the following steps;
    heating the thermoplastic plastic profile;
    winding the thermoplastic plastic profile in helically overlapping form onto a mandrel to obtain a wall thickness of between ten and ninety percent of total cap wall thickness;
    winding a thermoplastic plastic profile containing a reinforcing material to obtain additional cap wall thickness;
    stopping the winding of the thermoplastic plastic profile having a reinforcing material prior to obtaining the total wall thickness of the cap;
    winding the thermoplastic plastic profile over the reinforcing material to sandwich the reinforcing material within the thermoplastic plastic profile to obtain the desired cap wall thickness; and
    forming a thread on the exterior wall of the plastic protective cap.

15. A method of making a thermoplastic protective cap having a cylindrical wall from a thermoplastic plastic profile comprising the following steps;
   heating the thermoplastic plastic profile;
   winding the thermoplastic plastic profile in helically overlapping form onto a mandrel to obtain a wall thickness of between ten and ninety percent of total cap wall thickness;
   winding a thermoplastic plastic profile containing a reinforcing material to obtain additional cap wall thickness;
   stopping the winding of the thermoplastic plastic profile having a reinforcing material prior to obtaining the total wall thickness of the cap;
   winding the thermoplastic plastic profile over the reinforcing material to sandwich the reinforcing material within the thermoplastic plastic profile and to obtain the desired cap wall thickness; and
   cutting an internal thread on the inside of the thermoplastic plastic protective cap wall.

16. The method of claims 14 or 15 further characterized by;
   the thermoplastic plastic profile comprises a polyethylene material.

17. The method of claims 14 or 15 further characterized by;
   the length of the mandrel corresponds substantially to the length of the protective cap wall.

18. The method of claims 14 or 15 further characterized by;
   blowing reinforcing material onto the thermoplastic plastic profile during the winding operation.

19. The method of claims 14 and 15 further characterized by;
   the reinforcing material comprising a fiber mat.

20. The method of claims 14 and 15 further characterized by;
   the reinforcing material comprising stretched polyethylene.

21. The method of claims 14 and 145 further characterized by;
   the reinforcing material comprising glass fibers.

22. The method of claims 14 and 15 further characterized by;
   heating the mandrel prior to commencing winding of the thermoplastic plastic profile.

23. The method of claims 14 and 15 further characterized by;
   the mandrel comprises a hollow metal sleeve; and
   a thermoplastic cover overlies the end of the mandrel.

24. The method of claims 14 and 15 further characterized by;
   subjecting the internal cavity of the mandrel to a pressure less than the ambient pressure.

* * * * *